United States Patent
Tarlano et al.

(10) Patent No.: US 9,774,582 B2
(45) Date of Patent: Sep. 26, 2017

(54) PRIVATE CLOUD CONNECTED DEVICE CLUSTER ARCHITECTURE

(71) Applicant: Exablox Corporation, Sunnyvale, CA (US)

(72) Inventors: Anthony Tarlano, Menlo Park, CA (US); Tad Hunt, Sunnyvale, CA (US)

(73) Assignee: Exablox Corporation, Sunnyvale, CA (US)

( * ) Notice: Subject to any disclaimer, the term of this patent is extended or adjusted under 35 U.S.C. 154(b) by 37 days.

(21) Appl. No.: 14/171,651

(22) Filed: Feb. 3, 2014

(65) Prior Publication Data
US 2015/0222616 A1    Aug. 6, 2015

(51) Int. Cl.
| | |
|---|---|
| H04L 29/06 | (2006.01) |
| H04L 12/24 | (2006.01) |
| G06F 9/00 | (2006.01) |
| G06F 21/00 | (2013.01) |
| G06F 21/44 | (2013.01) |
| G06F 21/60 | (2013.01) |
| H04L 29/08 | (2006.01) |

(52) U.S. Cl.
CPC ............ H04L 63/08 (2013.01); G06F 9/00 (2013.01); G06F 21/00 (2013.01); G06F 21/44 (2013.01); G06F 21/604 (2013.01); H04L 41/28 (2013.01); H04L 63/0236 (2013.01); *H04L 67/02* (2013.01)

(58) Field of Classification Search
CPC .......... H04L 63/08; H04L 41/12; H04L 41/20
See application file for complete search history.

(56) References Cited

U.S. PATENT DOCUMENTS

| | | | |
|---|---|---|---|
| 4,656,604 | A | 4/1987 | van Loon |
| 4,660,130 | A | 4/1987 | Bartley et al. |
| 5,420,999 | A | 5/1995 | Mundy |
| 5,561,778 | A | 10/1996 | Fecteau et al. |
| 6,098,079 | A | 8/2000 | Howard |
| 6,167,437 | A | 12/2000 | Stevens et al. |
| 6,314,435 | B1 | 11/2001 | Wollrath et al. |
| 6,356,916 | B1 | 3/2002 | Yamatari et al. |

(Continued)

FOREIGN PATENT DOCUMENTS

| | | |
|---|---|---|
| EP | 1285354 | 2/2003 |
| EP | 2575379 | 4/2013 |

(Continued)

OTHER PUBLICATIONS

International Search Report dated Aug. 6, 2013 Application No. PCT/US2013/035675.

(Continued)

*Primary Examiner* — Kambiz Zand
*Assistant Examiner* — Mary Li
(74) *Attorney, Agent, or Firm* — Maschoff Brennan

(57) ABSTRACT

A system for secure cloud-based management of private cloud connected devices is provided. In one embodiment, the system comprises one or more on-site cloud connected devices located within an untrusted customer site, a multi-tenant cloud-based management service configured to manage the one or more on-site cloud connected devices, and a user interface to facilitate access to the one or more on-site cloud connected devices located within the untrusted customer site by a user associated with the untrusted customer site.

19 Claims, 8 Drawing Sheets

(56) References Cited

U.S. PATENT DOCUMENTS

| | | |
|---|---|---|
| 6,480,950 B1 | 11/2002 | Lyubashevskiy et al. |
| 7,043,494 B1 | 5/2006 | Joshi et al. |
| 7,177,980 B2 | 2/2007 | Milillo et al. |
| 7,197,622 B2 | 3/2007 | Torkelsson et al. |
| 7,266,555 B1 | 9/2007 | Coates et al. |
| 7,293,140 B2 | 11/2007 | Kano |
| 7,392,421 B1 | 6/2008 | Bloomstein et al. |
| 7,403,961 B1 | 7/2008 | Deepak et al. |
| 7,454,592 B1 | 11/2008 | Shah et al. |
| 7,539,836 B1 | 5/2009 | Klinkner |
| 7,685,109 B1 | 3/2010 | Ransil et al. |
| 7,827,218 B1 | 11/2010 | Mittal |
| 7,990,979 B2 | 8/2011 | Lu et al. |
| 8,099,605 B1 | 1/2012 | Billsrom et al. |
| 8,132,168 B2 | 3/2012 | Wires et al. |
| 8,364,887 B2 | 1/2013 | Wong et al. |
| 8,407,438 B1 | 3/2013 | Ranade |
| 8,447,733 B2 | 5/2013 | Sudhakar |
| 8,572,290 B1 | 10/2013 | Mukhopadhyay et al. |
| 8,868,926 B2 | 10/2014 | Hunt et al. |
| 9,043,567 B1 | 5/2015 | Modukuri et al. |
| 2002/0069340 A1 | 6/2002 | Tindal et al. |
| 2002/0087590 A1 | 7/2002 | Bacon et al. |
| 2003/0028585 A1 | 2/2003 | Yeager et al. |
| 2003/0056139 A1 | 3/2003 | Murray et al. |
| 2003/0072259 A1 | 4/2003 | Mor |
| 2003/0101173 A1 | 5/2003 | Lanzatella et al. |
| 2003/0115408 A1 | 6/2003 | Milillo et al. |
| 2004/0158588 A1 | 8/2004 | Pruet |
| 2004/0167898 A1 | 8/2004 | Margolus et al. |
| 2005/0071335 A1 | 3/2005 | Kadatch |
| 2005/0081041 A1 | 4/2005 | Hwang |
| 2005/0160170 A1 | 7/2005 | Schreter |
| 2006/0039371 A1 | 2/2006 | Castro et al. |
| 2006/0083247 A1 | 4/2006 | Mehta |
| 2006/0156396 A1 | 7/2006 | Hochfield et al. |
| 2006/0271540 A1 | 11/2006 | Williams |
| 2007/0005746 A1* | 1/2007 | Roe ............... H04L 12/2809 709/223 |
| 2007/0130232 A1 | 6/2007 | Therrien et al. |
| 2007/0203960 A1 | 8/2007 | Guo |
| 2007/0230368 A1 | 10/2007 | Shi et al. |
| 2007/0233828 A1 | 10/2007 | Gilbert |
| 2007/0271303 A1 | 11/2007 | Menendez et al. |
| 2008/0016507 A1 | 1/2008 | Thomas et al. |
| 2008/0133893 A1 | 6/2008 | Glew |
| 2008/0147872 A1 | 6/2008 | Regnier |
| 2008/0170550 A1 | 7/2008 | Liu et al. |
| 2008/0183973 A1 | 7/2008 | Aguilera et al. |
| 2008/0243938 A1 | 10/2008 | Kottomtharayil et al. |
| 2008/0244199 A1 | 10/2008 | Nakamura et al. |
| 2008/0292281 A1 | 11/2008 | Pecqueur et al. |
| 2009/0049240 A1 | 2/2009 | Oe et al. |
| 2009/0100212 A1 | 4/2009 | Boyd et al. |
| 2009/0172139 A1 | 7/2009 | Wong et al. |
| 2009/0198927 A1 | 8/2009 | Bondurant et al. |
| 2009/0307292 A1 | 12/2009 | Li et al. |
| 2009/0327312 A1 | 12/2009 | Kakivaya et al. |
| 2010/0031000 A1 | 2/2010 | Flynn et al. |
| 2010/0036862 A1 | 2/2010 | Das et al. |
| 2010/0114336 A1* | 5/2010 | Konieczny et al. ............ 700/17 |
| 2010/0122330 A1* | 5/2010 | McMillan ............ H04L 63/12 726/6 |
| 2010/0161817 A1 | 6/2010 | Xiao et al. |
| 2010/0172180 A1 | 7/2010 | Paley et al. |
| 2010/0191783 A1 | 7/2010 | Mason et al. |
| 2010/0217953 A1 | 8/2010 | Beaman et al. |
| 2010/0228798 A1 | 9/2010 | Kodama et al. |
| 2010/0262797 A1 | 10/2010 | Rosikiewicz et al. |
| 2010/0318645 A1 | 12/2010 | Hoole et al. |
| 2010/0332456 A1 | 12/2010 | Prahlad et al. |
| 2011/0026439 A1 | 2/2011 | Rollins |
| 2011/0034176 A1 | 2/2011 | Lord et al. |
| 2011/0060918 A1 | 3/2011 | Troncoso Pastoriza et al. |
| 2011/0106795 A1 | 5/2011 | Maim |
| 2011/0213754 A1 | 9/2011 | Bindal et al. |
| 2011/0231374 A1 | 9/2011 | Jain et al. |
| 2011/0231524 A1 | 9/2011 | Lin et al. |
| 2011/0264712 A1 | 10/2011 | Ylonen |
| 2011/0264989 A1 | 10/2011 | Resch et al. |
| 2011/0271007 A1 | 11/2011 | Wang et al. |
| 2012/0030260 A1 | 2/2012 | Lu et al. |
| 2012/0047181 A1 | 2/2012 | Baudel |
| 2012/0060072 A1 | 3/2012 | Simitci et al. |
| 2012/0078915 A1 | 3/2012 | Darcy |
| 2012/0096217 A1 | 4/2012 | Son et al. |
| 2012/0147937 A1 | 6/2012 | Goss et al. |
| 2012/0173790 A1 | 7/2012 | Hetzler et al. |
| 2012/0179808 A1 | 7/2012 | Bergkvist et al. |
| 2012/0185555 A1 | 7/2012 | Regni et al. |
| 2012/0233251 A1 | 9/2012 | Holt et al. |
| 2012/0290535 A1 | 11/2012 | Patel et al. |
| 2012/0290629 A1 | 11/2012 | Beaverson et al. |
| 2012/0323850 A1 | 12/2012 | Hildebrand et al. |
| 2012/0331528 A1* | 12/2012 | Fu et al. ............ 726/4 |
| 2013/0013571 A1 | 1/2013 | Sorenson et al. |
| 2013/0041931 A1* | 2/2013 | Brand ............ 709/203 |
| 2013/0054924 A1 | 2/2013 | Dudgeon et al. |
| 2013/0073821 A1 | 3/2013 | Flynn et al. |
| 2013/0086004 A1 | 4/2013 | Chao et al. |
| 2013/0091180 A1 | 4/2013 | Vicat-Blanc-Primet et al. |
| 2013/0162160 A1 | 6/2013 | Ganton et al. |
| 2013/0166818 A1 | 6/2013 | Sela |
| 2013/0185508 A1 | 7/2013 | Talagala et al. |
| 2013/0235192 A1 | 9/2013 | Quinn et al. |
| 2013/0246589 A1 | 9/2013 | Klemba et al. |
| 2013/0262638 A1 | 10/2013 | Kumarasamy et al. |
| 2013/0263151 A1 | 10/2013 | Li et al. |
| 2013/0268644 A1 | 10/2013 | Hardin et al. |
| 2013/0268770 A1 | 10/2013 | Hunt et al. |
| 2013/0282798 A1 | 10/2013 | McCarthy et al. |
| 2013/0288668 A1 | 10/2013 | Pragada et al. |
| 2013/0311574 A1 | 11/2013 | Lal |
| 2013/0346591 A1* | 12/2013 | Carroll et al. ............ 709/224 |
| 2013/0346839 A1 | 12/2013 | Dinha |
| 2014/0006580 A1* | 1/2014 | Raghu ............ 709/223 |
| 2014/0007178 A1 | 1/2014 | Gillum et al. |
| 2014/0059405 A1 | 2/2014 | Syu et al. |
| 2014/0297604 A1 | 10/2014 | Brand |
| 2014/0317065 A1 | 10/2014 | Barrus |
| 2014/0335480 A1* | 11/2014 | Asenjo et al. ............ 434/107 |
| 2014/0351419 A1 | 11/2014 | Hunt et al. |
| 2014/0372490 A1 | 12/2014 | Barrus et al. |
| 2014/0379671 A1 | 12/2014 | Barrus et al. |
| 2015/0012763 A1* | 1/2015 | Cohen ............ H04L 67/125 713/310 |
| 2015/0019491 A1 | 1/2015 | Hunt et al. |
| 2015/0066524 A1* | 3/2015 | Fairbrothers et al. ............ 705/2 |
| 2015/0081964 A1 | 3/2015 | Kihara et al. |
| 2015/0106335 A1 | 4/2015 | Hunt et al. |
| 2015/0106579 A1 | 4/2015 | Barrus |
| 2015/0172114 A1 | 6/2015 | Tarlano et al. |
| 2015/0220578 A1 | 8/2015 | Hunt et al. |

FOREIGN PATENT DOCUMENTS

| | | |
|---|---|---|
| EP | 2834749 | 2/2015 |
| EP | 2834943 | 2/2015 |
| EP | 2989549 A1 | 3/2016 |
| EP | 3000205 A1 | 3/2016 |
| EP | 3000289 A2 | 3/2016 |
| EP | 3008647 A1 | 4/2016 |
| EP | 3011428 A1 | 4/2016 |
| EP | 3019960 | 5/2016 |
| EP | 3020259 | 5/2016 |
| JP | 2004252663 A | 9/2004 |
| JP | 2010146067 A | 7/2010 |
| JP | 2011095976 A | 5/2011 |
| JP | 2012048424 A | 3/2012 |
| WO | WO2013152357 | 10/2013 |
| WO | WO2013152358 | 10/2013 |
| WO | WO2014176264 | 10/2014 |
| WO | WO2014190093 | 11/2014 |
| WO | WO2014201270 | 12/2014 |

(56) References Cited

FOREIGN PATENT DOCUMENTS

| WO | WO2014205286 | 12/2014 |
|---|---|---|
| WO | WO2015006371 | 1/2015 |
| WO | WO2015054664 A1 | 4/2015 |
| WO | WO2015057576 A1 | 4/2015 |
| WO | WO2015088761 A1 | 6/2015 |
| WO | WO2015116863 A1 | 8/2015 |
| WO | WO2015120071 A2 | 8/2015 |

OTHER PUBLICATIONS

Huck et al. Architectural Support for Translation Table Management in Large Address Space Machines. ISCA '93 Proceedings of the 20th Annual International Symposium on Computer Architecture, vol. 21, No. 2. May 1993. pp. 39-50.
International Search Report dated Aug. 2, 2013 Application No. PCT/US2013/035673.
International Search Report dated Sep. 10, 2014 Application No. PCT/US2014/035008.
Askitis, Nikolas et al., "HAT-trie: A Cache-conscious Trie-based Data Structure for Strings".
International Search Report dated Sep. 24, 2014 Application No. PCT/US2014/039036.
International Search Report dated Oct. 22, 2014 Application No. PCT/US2014/043283.
International Search Report dated Nov. 7, 2014 Application No. PCT/US2014/042155.
International Search Report dated Jan. 21, 2015 Application No. PCT/US2014/060176.
International Search Report dated Feb. 24, 2015 Application No. PCT/US2014/060280.
International Search Report dated Mar. 4, 2015 Application No. PCT/US2014/067110.
International Search Report dated Apr. 2, 2015 Application No. PCT/US2014/045822.
International Sesarch Report dated May 14, 2015 Application No. PCT/US2015/013611.
International Sesarch Report dated May 15, 2015 Application No. PCT/US2015/014492.
Invitation pursuant to Rule 63(1) dated May 19, 2015 Application No. 13772293.0.
Extended European Search Report dated Aug. 4, 2015 Application No. 13771965.4.
Dabek et al. "Wide-area cooperative storage with CFS", Proceedings of the ACM Symposium on Operating Systems Principles, Oct. 1, 2001. pp. 202-215.
Stoica et al. "Chord: A Scalable Peer-to-peer Lookup Service for Internet Applications", Computer Communication Review, ACM, New York, NY, US, vol. 31, No. 4, Oct. 1, 2001. pp. 149-160.
Non-Final Office Action, Jun. 24, 2015, U.S. Appl. No. 13/441,592, filed Apr. 6, 2012.
Non-Final Office Action, Jun. 29, 2015, U.S. Appl. No. 14/055,662, filed Oct. 16, 2013.
Extended European Search Report dated Aug. 20, 2015 Application No. 13772293.0.
Office Action dated Mar. 15, 2016 in Japanese Patent Application No. 2015-504769 filed Apr. 8, 2013.
Office Action, dated Nov. 5, 2013, U.S. Appl. No. 13/441,715, filed Apr. 6, 2012.
Notice of Allowance, dated Mar. 27, 2014, U.S. Appl. No. 13/441,715, filed Apr. 6, 2012.
Office Action, dated Nov. 13, 2013, U.S. Appl. No. 13/441,592, filed Apr. 6, 2012.
Office Action, dated May 19, 2014, U.S. Appl. No. 13/441,592, filed Apr. 6, 2012.
Final Office Action, dated Nov. 20, 2014, U.S. Appl. No. 13/441,592, filed Apr. 6, 2012.
Advisory Action, dated Feb. 19, 2015, U.S. Appl. No. 13/441,592, filed Apr. 6, 2012.

\* cited by examiner

200

PROVIDING A MULTI-TENANT CLOUD-BASED MANAGEMENT SERVICE CONFIGURED TO MANAGE ONE OR MORE ON-SITE CLOUD CONNECTED DEVICES LOCATED WITHIN AN UNTRUSTED CUSTOMER SITE
205

PROVIDING A USER INTERFACE TO FACILITATE ACCESS TO THE ONE OR MORE ON-SITE CLOUD CONNECTED DEVICES LOCATED WITHIN THE SECURE CUSTOMER SITE BY A USER ASSOCIATED WITH THE UNTRUSTED CUSTOMER SITE
210

FIG. 2

(Continuation from Fig. 3A)

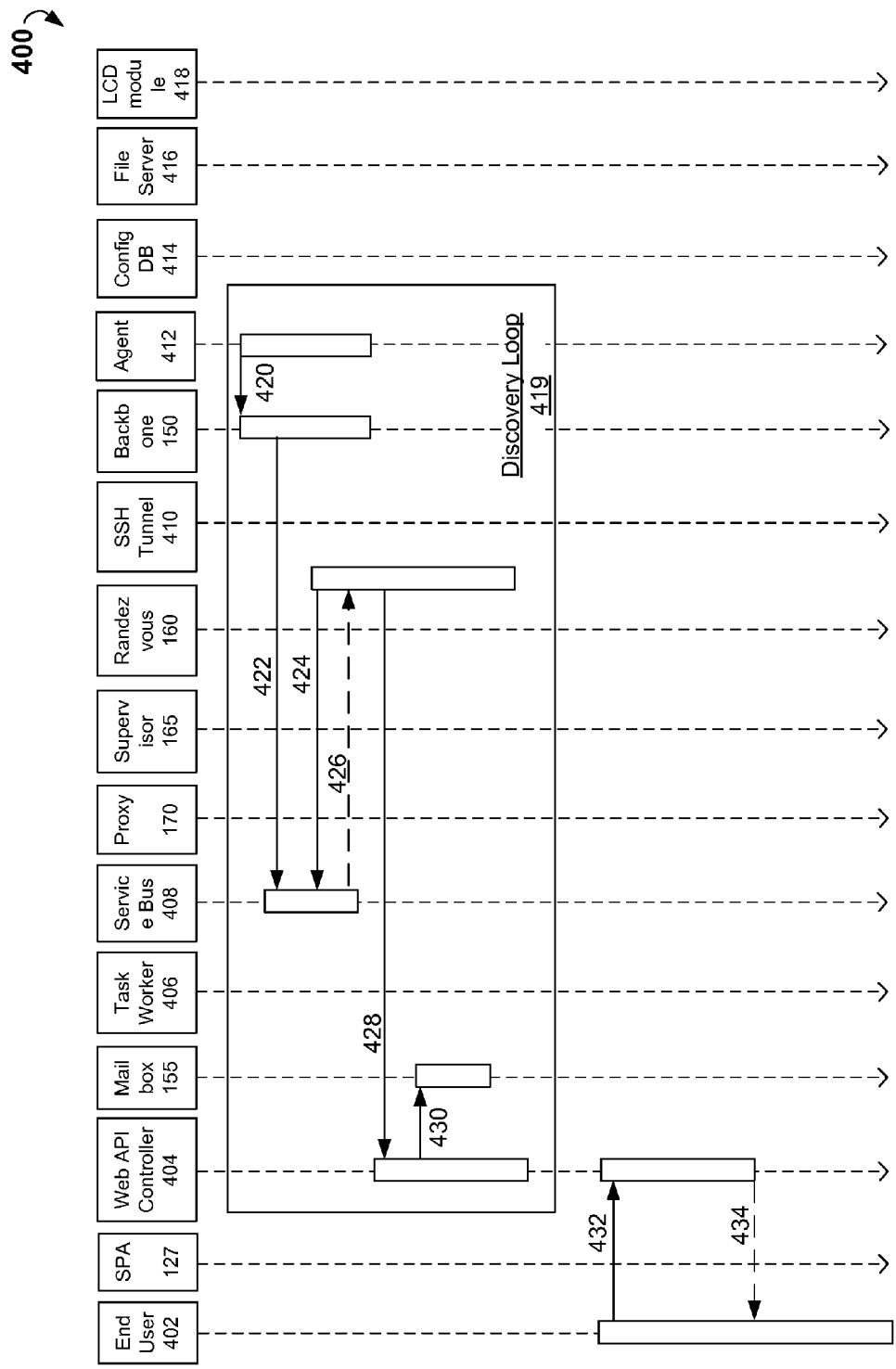

(Continuation from Fig. 4A)

(Continuation from Fig. 4B)

PRIVATE CLOUD CONNECTED DEVICE CLUSTER ARCHITECTURE

TECHNICAL FIELD

This disclosure relates generally to web services and cloud management services and, more particularly, to private cloud connected device clusters architecture.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Conventional cloud computing allows sharing computing resources between various applications. In cloud computing, different services, such as storage and applications can be delivered to an organization's computers and devices through the Internet. Cloud computing involves a considerable management effort to support the software and technologies designed for operating, monitoring, optimization, and proper interaction between users, applications, data, and services residing in the cloud. Cloud management may also involve numerous tasks including performance monitoring, security and compliance auditing and management, and initiating and overseeing disaster recovery and contingency plans.

Conventional solutions to address various security concerns include private cloud platforms implemented on a Local-Area Network (LAN) within an organization's firewall. However, because private cloud storage services are managed internally by the organization, they involve high capital and maintenance costs. Additionally, the organization will need to take the responsibility for running and managing resources instead of passing that responsibility on to a third-party cloud provider.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to an aspect of the present disclosure, a system for secure cloud-based management of private cloud connected devices is provided. The system may include one or more on-site cloud connected devices located within an untrusted customer site. Furthermore, the system may include a user interface to facilitate access to the on-site cloud connected devices by a user associated with the untrusted customer site. The system may further include a multi-tenant cloud-based management service configured to manage the on-site cloud connected devices. The multi-tenant cloud-based management service may include a website domain configured to manage the user interface and a backend domain configured to manage the on-site cloud connected devices.

In another aspect of the present disclosure, a method for secure cloud-based management of private cloud connected devices is provided. The method may comprise providing a multi-tenant cloud-based management service configured to manage one or more on-site cloud connected devices located within an untrusted customer site. The method may further include providing a user interface to facilitate access to the on-site cloud connected devices located within the untrusted customer site by a user associated with the untrusted customer site.

In further example embodiments of the present disclosure, the method steps are stored on a machine-readable medium comprising instructions, which when implemented by one or more processors perform the recited steps. In yet further example embodiments, hardware systems or devices can be adapted to perform the recited steps. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements and in which:

FIG. 2 is a process flow diagram showing a method for secure cloud-based management of private cloud connected devices according to an example embodiment.

FIGS. 4A-4C are high level timing diagrams showing principles for secure cloud-based management of private cloud connected devices according to an example embodiment.

DETAILED DESCRIPTION

Figure 1:
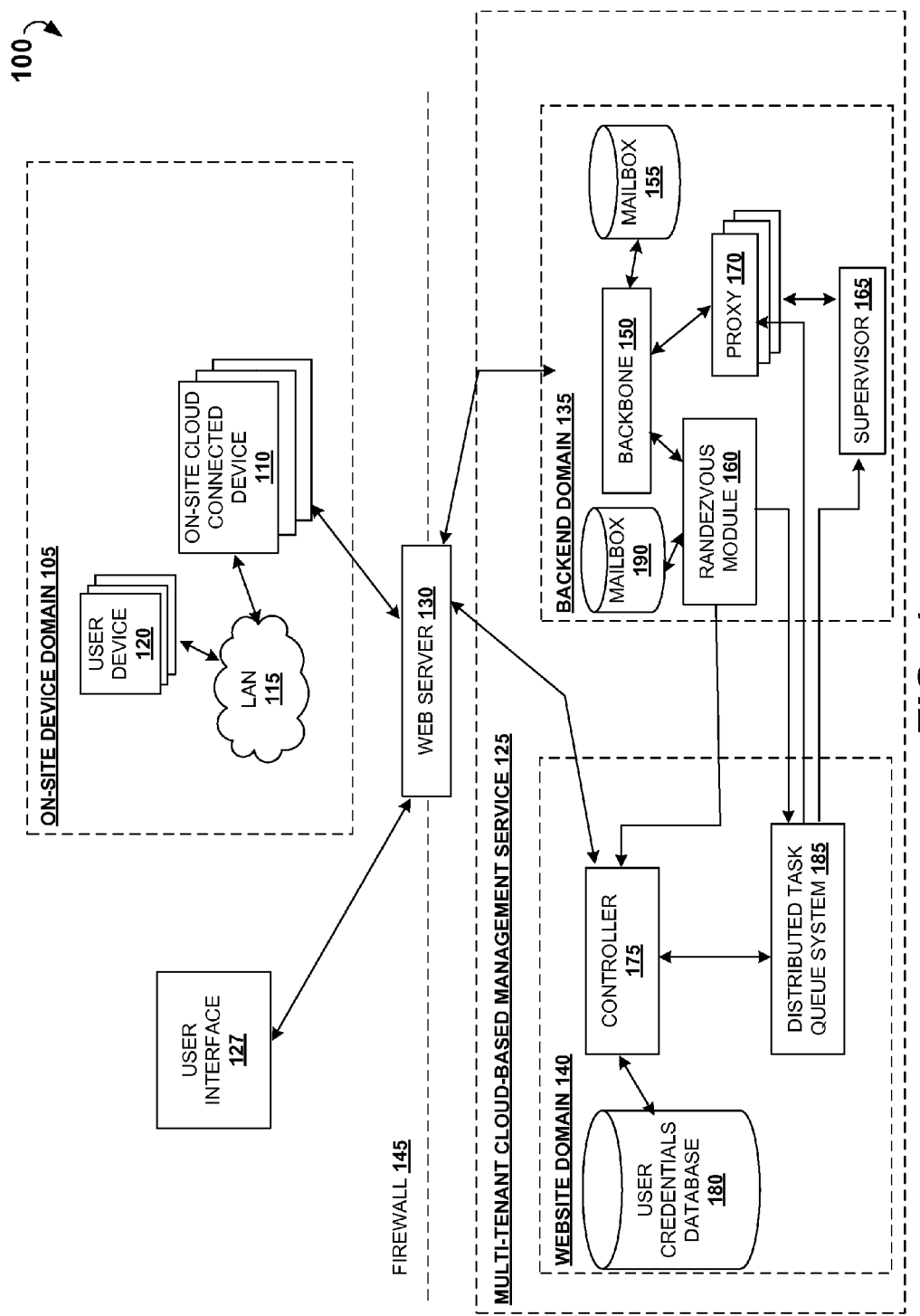
FIG. 1 shows a high level block diagram of system architecture suitable for implementing embodiments of the present disclosure.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or computer-readable medium. It should be noted that methods disclosed herein can be implemented by a computer (e.g., a desktop computer, tablet computer, laptop computer), game console, handheld gaming device, cellular phone, smart phone, smart television system, and so forth.

The technology described herein allows implementing a private cloud computing platform securely behind a corporate firewall while allowing a third party provider to take responsibility for managing cloud computing resources, and providing efficient and seamless storage allocation and scalability, data security and integrity.

An architecture of an example system for secure cloud-based management of private cloud connected devices may include a user interface, i.e. an interface provided by a web application such as a Single Page Application (SPA), running within a web browser. The architecture may further include an on-site device domain supporting private cloud connected devices. The private cloud connected devices may include on-site cloud connected devices located within an untrusted or insecure customer site of an enterprise Local Area Network (LAN). The user interface may facilitate access to the on-site cloud connected devices by a user associated with the untrusted customer site. The example architecture may further include a multi-tenant cloud-based management service to manage the on-site cloud connected devices. The multi-tenant cloud-based management service may include a website domain supporting the user interface and backend domain supporting auto-discovery of the on-site cloud connected devices and registration of services to the cloud connected devices.

The website domain may include a controller coordinating secure requests, such as HTTPS, associated with the web application. The backend domain may include a backbone coordinating secure requests associated with the on-site cloud connected devices. The backend domain may include a rendezvous module to handle communication exchanges between the device domain and website domain. Typically, the web application and on-site cloud connected devices are located within an untrusted domain while the website and backend are located within a trusted domain, the trusted and untrusted domains being separated by a firewall. To ensure data integrity, communications between the untrusted and trusted domains may utilize various secure protocols, such as HTTPS.

Using one or more of the secure protocols, an unbound on-site cloud connected device may announce itself by posting a message to the mailbox of the rendezvous module upon a boot-up. The message may include a device IP address and other cloud connected device-related metadata. Once the unbound on-site cloud connected device is bound to a service associated with the user interface, further communications between the on-site cloud connected devices and user interface may be handed off to a service proxy mailbox. The private cloud connected devices can be assigned to the service proxy, with the private cloud connected device using the service proxy mailbox for posting messages to the backbone and another mailbox for receiving messages from the backbone.

The backend domain may also include a supervisor to manage the lifecycle of the service proxy instances. One or more proxies may be distributed among a plurality of machines to provide scalability. The supervisor may continue monitoring the mailbox for messages related to the service proxy.

An example interaction of components of the system for secure cloud-based management of private cloud connected devices may comprise the following steps. Firstly, an on-site cloud connected device associated with the architecture described above may announce its presence to the multi-tenant cloud-based management service. The on-site cloud connected device may include or be associated with an agent that can be used to announce the presence of the on-site cloud connected device to a rendezvous module of the multi-tenant cloud-based management service. The rendezvous module may register agent's availability with a controller in the backend domain. The controller may store agent's availability to a database.

A user, having an account with the service, may, upon a successful login, get redirected to a private cloud connected device discovery wizard. Upon verification of user credentials, the controller may enable the private cloud connected device discovery wizard so that the user is prompted to continue as the controller queries a database to determine whether any unbound on-site cloud connected devices may be possibly placed under administrative control of the user. A correlation can be made to filter available on-site cloud connected devices down to a small set of likely candidates.

The correlation may be based on a comparison of IP addresses. For example, a public IP address associated with the user interface can be compared to a public IP address of the unbound on-site cloud connected device. In some instances, a user outside the LAN may be allowed to utilize the system by providing an IP address manually.

After the comparison is made, candidates that can be possibly bound to the service are presented, e.g. displayed, to the user along with other information (e.g., a host name, IP, mac address, on-site device ID, cluster ID, versioning information) associated with the on-site cloud connected device. The user may be allowed to request administrative control of one or more of these unbound on-site cloud connected devices by selection of the one or more unbound on-site cloud connected devices.

Once the user selects an on-site cloud connected device, or a group of devices, the user will be required to prove the ownership of the on-site cloud connected device (or the user device associated with the on-site cloud connected device) by interacting with the on-site cloud connected device through an independent channel of communications, for example, by observing a display of the user device physically coupled to the on-site cloud connected device or any other output device. A code previously unknown to the user can be sent from the controller to the output device associated with the on-site cloud connected device. In other words, each selected on-site cloud connected device can make the code available for the user to read, for example, by displaying it on an LCD display associated with the device. The user is required to enter the code in the private cloud connected device discovery wizard to prove the ownership. Upon entering the code in the private cloud connected device discovery wizard, the administrative control of the user for the selected on-site cloud connected device may be confirmed.

FIG. 1 shows a high level block diagram of system architecture 100 suitable for implementing embodiments of the present disclosure. As shown in the figure, an on-site device domain 105 may include one or more on-site cloud connected devices 110. The user may utilize interface 127 to access the on-site cloud connected device located within the untrusted customer site. The user interface 127 may include, for example, a SPA or a similar web service running within a web browser which may be used for binding the on-site cloud connected device 110 to a multi-tenant cloud-based management service 125. The on-site cloud connected device 110 and the user interface 127 may be located on a Local-Area Network (LAN).

The multi-tenant cloud-based management service 125 may include a service configured to manage the on-site cloud connected devices 110 associated with the user. The multi-tenant cloud-based management service 125 may include a website domain 140 configured to manage the user interface 127 and a backend domain 135 configured to manage the on-site cloud connected device 110. The system architecture 100 may also include a web server 130 responsible for communication between the backend domain 135, the website domain 140, and the on-site device domain 105. The web server 130 may utilize a firewall 145 separating a trusted domain (i.e., the backend domain 135 and the website domain 140) and an untrusted domain (i.e., the user interface 127 and the on-site cloud connected device 110). The web server 130 may communicate and transmit data using HTTP, HTTP Secure (HTTPS), or other protocols. The user interface 127 and the one or more on-site cloud connected devices 110 may use security protocols to communicate to the trusted domain while not bound to the multi-tenant cloud-based management service 125.

Although not shown in FIG. 1, the communications and data transmission between the web server 130, the backend domain 135, the website domain 140, and the on-site device domain 105 may be facilitated by one or more networks. For example, the one or more networks may include one or more of the following: the Internet, local intranet, PAN (Personal Area Network), LAN, WAN (Wide Area Network), MAN (Metropolitan Area Network), virtual private network (VPN), storage area network (SAN), frame relay connection, Advanced Intelligent Network (AIN) connection, synchronous optical network (SONET) connection, digital T1, T3, E1 or E3 line, Digital Data Service (DDS) connection, DSL (Digital Subscriber Line) connection, Ethernet connection, ISDN (Integrated Services Digital Network) line, cable modem, ATM (Asynchronous Transfer Mode) connection, or an FDDI (Fiber Distributed Data Interface) or CDDI (Copper Distributed Data Interface) connection. Furthermore, communications may also include links to any of a variety of wireless networks including, GPRS (General Packet Radio Service), GSM (Global System for Mobile Communication), CDMA (Code Division Multiple Access) or TDMA (Time Division Multiple Access), cellular phone networks, GPS, CDPD (cellular digital packet data), RIM (Research in Motion, Limited) duplex paging network, Bluetooth radio, or an IEEE 802.11-based radio frequency network.

The backend domain 135 may manage or support various services associated with the on-site cloud connected devices 110, as well as support auto-discovery of the on-site cloud connected devices 110. The backend domain 135 may include a backbone 150 for managing data transmission and handling requests from the on-site cloud connected devices 110 utilizing, for example, HTTP or HTTPS protocols. The backbone 150 may be associated or operatively coupled to a database referred herein as "mailbox" 155, which stores identifications, operation statuses, and messages associated with the on-site cloud connected devices 110. The backend domain 135 may further include a rendezvous module 160 configured to handle communication exchanges with the website domain 140 for unbound cloud connected devices 110 or unbound groups of devices and its components utilizing a protocol or protocols, which may be different from the protocol used for communications between the service proxy 170, the on-site cloud connected device 110, the website domain 140, and the web server 130. For example, the rendezvous module 160 may utilize JSON-RPC for communication with the website domain 140. Furthermore, the rendezvous module 160 may be associated or operatively coupled to another database referred herein as "mailbox" 190 which can be used by the rendezvous module 160 for sending messages to the unbound devices 110 or the groups of unbound devices. Furthermore, the service proxy 170 may be associated or operatively coupled to a database referred herein as "mailbox" 155, which stores identifications, operation statuses, and messages of the devices 110 or the groups of devices that have been bound to the service.

Furthermore, the rendezvous module 160 can assign various services to the cloud connected devices 110 or the group of cloud connected devices, and associate (bind) the unbound cloud connected device 110 or the unbound groups of cloud connected devices with the service once the user of the unbound cloud connected device 110 or the unbound group of cloud connected devices is authenticated and proves possession of the unbound cloud connected device 110 or the unbound group of cloud connected devices or associated user device(s) or output device(s).

Furthermore, as shown in the figure, the backend domain 135 may include a supervisor 165 for managing the lifecycle of the proxies 170 through monitoring the mailbox 155 for the statuses (flags) of the on-site cloud connected devices 110 or the group of devices, assigning various services for the on-site cloud connected devices 110, and associating (binding) the unbound on-site cloud connected devices with the on-site cloud connected devices 110 once the user of the unbound on-site cloud connected devices is authenticated and proves the possession of unbound on-site cloud connected devices or associated user device(s) or output device (s). Furthermore, the backend domain 135 may include a number of proxies 170, e.g. associated with the on-site cloud connected devices 110, through which communication and services may be provided. The proxy 170 may run on a separate machine (i.e., outside the backend domain 135) to provide sufficient scalability.

Still referring to FIG. 1, the website domain 140 may include a controller 175 configured to handle requests and provide responses to the web application associated with the user interface 127 (e.g., SPA) and responsible for user authentication. To these ends, the website domain 140 may include a database 180 for storing user credentials and related information. Furthermore, the website domain 140 may include a distributed task queue system 185 for allowing communication with the backend domain 135 to utilize, for example, JSON-RPC protocol and/or corresponding secure communication channels. The distributed task queue system 185 may process vast numbers of messages, while providing operations with the tools required for maintaining such a system; it's a task queue with a focus on real-time or non real-time processing, while also supporting task scheduling.

The website domain 140 and/or the backend domain 135 may utilize a number of auxiliary components, such as configuration databases, file servers, proxies, storages, computing units, network routers, and the like, which are omitted for clarity purposes.

FIG. 2 is a process flow diagram showing a method 200 for provisioning a service according to an example embodiment. The method 200 may be performed by processing logic that may comprise hardware (e.g., decision making logic, dedicated logic, programmable logic, and microcode), software (such as software run on a general-purpose computer system or a dedicated machine), or a combination of both. In one example embodiment, the processing logic resides at the backend domain 135 and/or the website domain 140. In other words, the method 200 can be performed by various components discussed above with reference to FIG. 1.

As shown in FIG. 2, the method 200 may commence at operation 205, at which a multi-tenant cloud-based management service configured to manage an on-site private cloud connected device located within an insecure or untrusted customer site may be provided. Providing the multi-tenant cloud-based management service may involve providing a website domain configured to manage the user interface and providing a backend domain configured to manage the on-site cloud connected device. The backend domain may include a backbone configured to manage data transmission associated with the on-site cloud connected device utilizing a first data transmission protocol. The first data transmission protocol may include Hypertext Transfer Protocol Secure (HTTPS). The backbone may include a mailbox configured to store identification of the on-site cloud connected device. Furthermore, the backend domain may include a rendezvous module configured to manage data transmission between the website domain and the backbone utilizing a second data transmission protocol. The second data transmission protocol may include JavaScript Object Notation Remote Procedure Call (JSON-RPC). The rendezvous module may include a mailbox configured to store identifications of the unbound on-site cloud connected devices.

The backend domain may also include a supervisor configured to associate one or more unbound on-site cloud connected devices of the user with service proxy based on predetermined rules. Furthermore, the backend domain may include a proxy configured to be associated with the on-site cloud connected device. The proxy may run on a separate machine to provide scalability.

At operation 210 of the method 200, a user interface may be provided to facilitate access to the on-site cloud connected device located within the untrusted device domain by a user associated with the secure customer site. The user interface and the on-site cloud connected device may be located on a LAN. Furthermore, the user interface and the on-site cloud connected device may be located within an untrusted domain, while the website domain and the backend domain are located within a trusted domain. The trusted domain and the untrusted domain can be separated by a firewall. The user interface and the one or more unbound on-site cloud connected devices may use security protocols to communicate to the trusted domain.

Figure 3A:
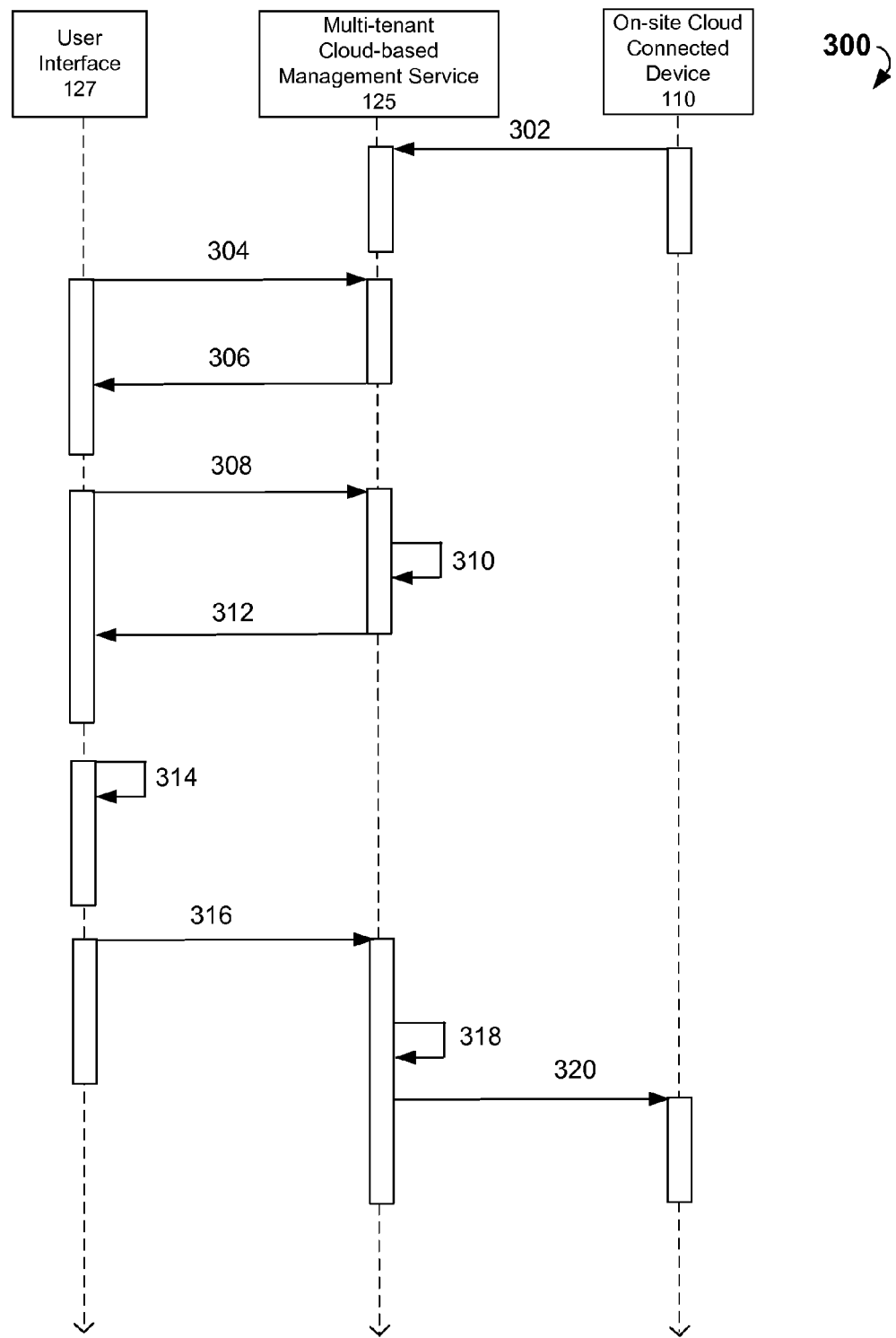
FIGS. 3A-3B show high level timing diagram illustrating interactions of various system modules for secure cloud-based management of private cloud connected devices according to various example embodiments.
Figure 3B:
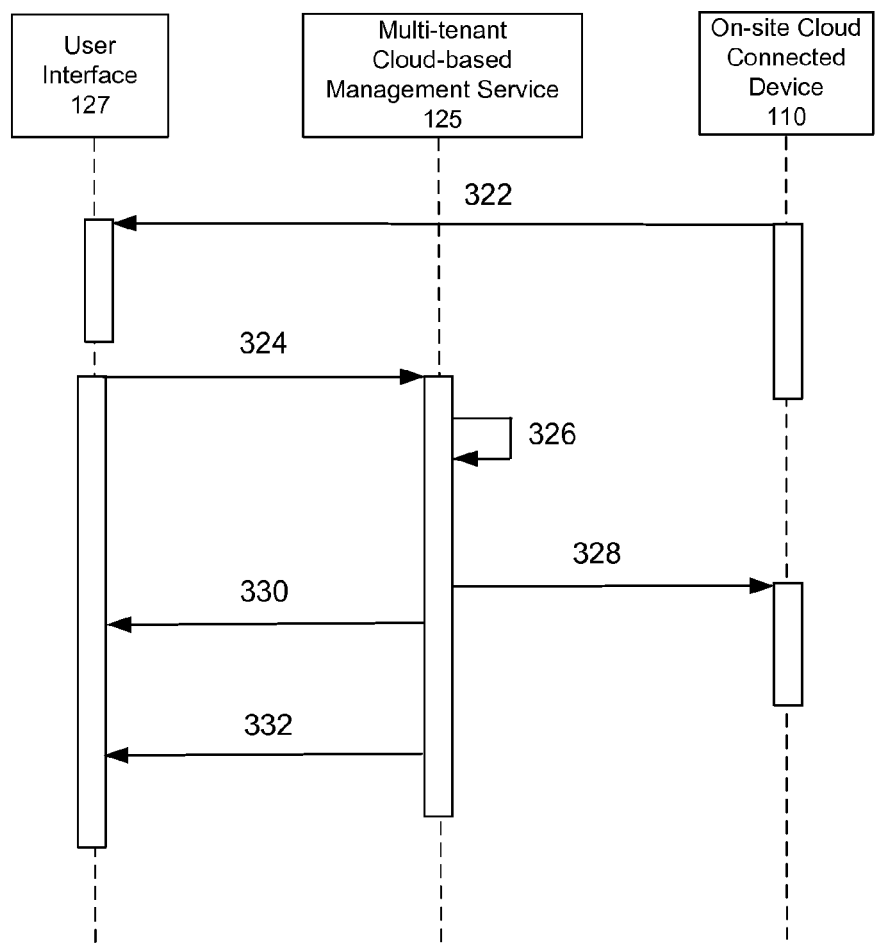

FIGS. 3A-3B show high level timing diagram 300 illustrating interactions of various system modules for managing and provisioning networked storage resources according to various example embodiments. More specifically, FIGS. 3A-3B illustrate interactions between on-site cloud connected device 110, a multi-tenant cloud-based management service 125, and a user interface 127. As shown in FIG. 3A, the process may commence at operation 302 with the multi-tenant cloud-based management service 125 receiving one or more availability messages from the one or more unbound on-site cloud connected devices 110. The availability messages may be received by the mailbox 155 of the rendezvous module and include respective on-site cloud connected device identifying data, IP addresses, host names, machine addresses, cluster identifying data, versioning information, and so forth. These messages may be generated, for example, upon initialization (activation) of the on-site cloud connected device or in response to the user intention to access private data or computational resources through binding the one or more unbound data on-site cloud connected devices with the on-site cloud connected devices 110. A dedicated software agent may be utilized by the one or more unbound data on-site cloud connected devices to generate and communicate the availability messages.

At operation 304, the website domain of the multi-tenant cloud-based management service 125 may receive, from the user via the user interface 127, a request for the service, which may include service identifying data or other related information. At this step, the user may be also authenticated. For example, the user may be prompted to provide credentials (such as logins, passwords, pin codes, and the like), which can be matched to the data in the database. After verifying the user credentials, an SPA may be provided by the multi-tenant cloud-based management service 125 to the user interface 127 at operation 306.

At operation 308, the user may request an administrative control of one or more on-site cloud connected devices 110. At operation 310, the controller of the multi-tenant cloud-based management service 125 may correlate the service identifying data to the on-site cloud connected devices identifying data stored in the mailbox. In certain embodiments, the service identifying data may include a public IP address associated with the user interface 127 (user interface IP address), while the on-site cloud connected device identifying data may include an IP address associated with the one or more unbound on-site cloud connected devices (cloud connected device IP address). Accordingly, the correlation operation 310 may involve comparing the user interface IP address to the cloud connected device IP address. In various embodiments, the user interface IP address may be either automatically determined or manually provided by the user. Additionally, the correlation operation 310 may use request creation time, query time, and the like.

At operation 312, the controller may select one or more candidate unbound on-site cloud connected devices 125 from the one or more unbound on-site cloud connected devices based on the correlation and data stored in various databases and return a list of candidate unbound on-site cloud connected devices to the user interface 127. In certain embodiments, the cloud connected device IP address may relate to a plurality of user devices, network devices or other apparatuses. At operation 314, the available on-site cloud connected devices may be displayed to the user via the user interface 127. Accordingly, at operation 316, the user may be prompted to select one unbound on-site cloud connected device from the one or more candidate unbound on-site cloud connected devices based on the on-site cloud connected device identifying data. For example, the user may select the on-site cloud connected device that is specifically in the possession of the user. The controller may receive selected unbound on-site cloud connected devices from the user.

At operation 318, the controller (or, in certain circumstances, the backend domain) may create a code (referred to herein as machine generated code). At operation 320, the controller may send the machine generated code to a device associated with the selected on-site cloud connected device 110. The code may relate to alpha-numerical message (e.g., this code may be randomly generated), still or animated image, audio message, or activation instruction.

The representation of the process 300 continues on FIG. 3B. At operation 322, upon receipt of the machine generated code by corresponding output device associated with the unbound on-site cloud connected device, the machine generated code may be shown on a display of the on-site cloud connected device 110, played back, or other function activated such as a vibrational signal may be generated.

At operation 324, the user may be prompted to confirm the ownership of the selected unbound on-site cloud connected device 110 by entering the machine generated code in the user interface 127.

At operation 326, the controller may receive from the user, via the user interface 127, a human entered code and compare the machine generated code to the human entered code. At operation 328, the controller may selectively bind the selected on-site cloud connected device 110 to the service based on the result of comparison in case the machine generated code and the human entered code match. This can be accomplished by the backend domain generating a corresponding record in the mailbox. In certain embodiments, the service may be handed off to the proxy to provide secure data communication. A number of other security and data integrity policies pertaining to the private data on-site cloud connected devices 110 may be also implemented. At operation 330, the user may be notified about successful binding of the on-site cloud connected device selected by the user to the multi-tenant cloud-based management service 125. If the machine generated code and the human entered code do not match, at operation 322 the user may be notified about the failure to bind the on-site cloud connected device 110 selected by the user to the multi-tenant cloud-based management service 125.

Figure 4B:
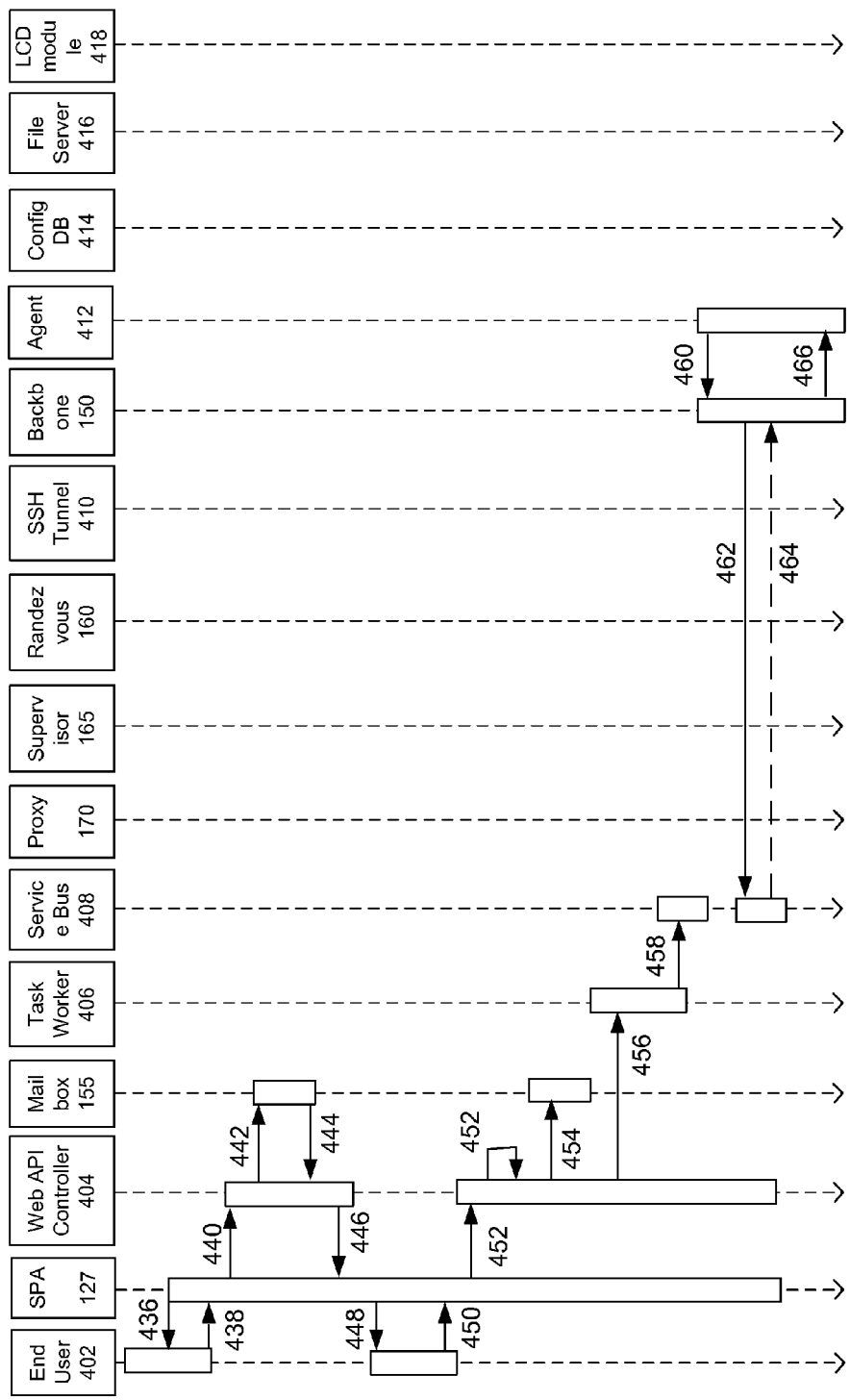
Figure 4C:
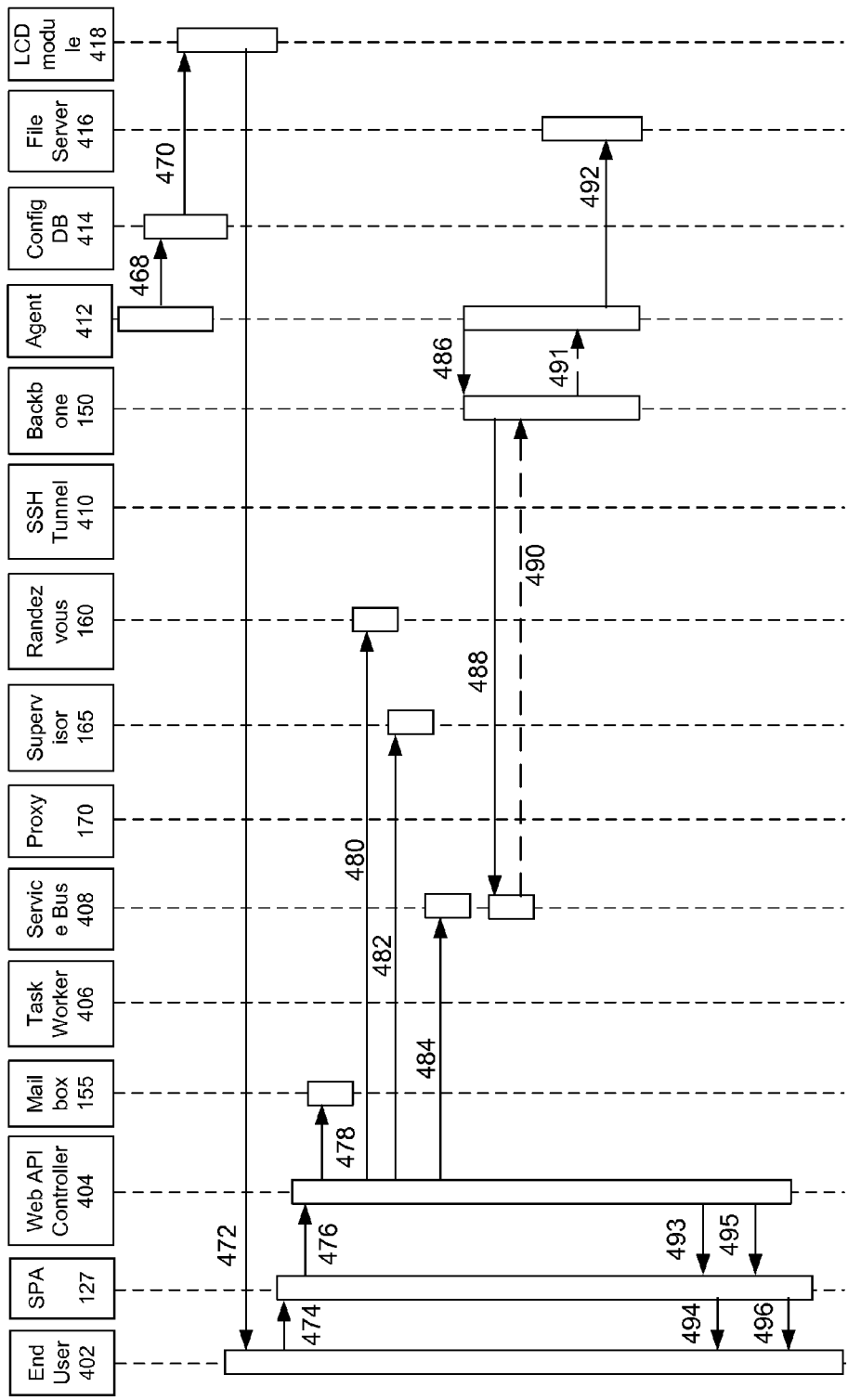

FIGS. 4A-4C show high level timing diagram 400 illustrating interaction of various system modules for managing and provisioning networked storage resources according to various example embodiments. The process can be initiated by an agent 412 associated with the unbound on-site cloud connected devices through generation of a handshake message and transmitting the handshake message to the backbone 150 at operation 420. In certain embodiments, the handshake message may include a public IP address, cluster ID, on-site device ID, name, RPC version, serial number, model number, storage ring name, host name, message creation time, and so forth. The handshake message may be generated when, for example, the unbound device is connected to a network or turned on. It should be also mentioned that, in certain embodiments, the agent 412 may refer to a dedicated process running in the website domain or the webserver.

At the following operation 422, the handshake message may be transmitted to a service bus 408 (which may be associated, for example, with the webserver). At operation 424, the service bus 408 may retrieve corresponding information from the rendezvous module related to all or recent messages generated by the on-site cloud connected device 110. At operation 426, the service bus 408 may confirm safe receipt of the messages by the rendezvous module. Furthermore, at operation 428, the rendezvous module may generate a post handshake message including metadata associated with the unbound on-site cloud connected device, and transmit the metadata to a web API controller 404 (e.g., the controller 175 as shown on FIG. 1). At operation 430, the web API controller 404 may store the post handshake message including metadata in the mailbox 155 or any other suitable database. Thus, in operations 420-430, a "discovery loop" 418 directed to "registering" a newly appeared unbound on-site cloud connected device with the service can be implemented.

Still referring to FIG. 4A, at operation 432 the user may access a specific webpage or SPA 127 using an end user 402 device (i.e., any suitable user device associated with the unbound data on-site cloud connected device) and provide login credentials. At the operation 432, the credentials can be transmitted to the web API controller 404 for user verification/authentication, and, at operation 434, the web API controller 404 may respond as to whether the user is successfully identified/authenticated.

Furthermore, as shown in FIG. 4B, at operation 436, the SPA 127 may ask the user whether he wants to bind the unbound on-site cloud connected devices. At operation 438, the user may request to bind the unbound on-site cloud connected devices by interacting with the SPA 127. If this is the case, at operation 440, the SPA 127 may generate a request including a SPA Public IP address and send the request to the web API controller 404. In response, the web API controller 404, at operation 442, may search for candidate on-site cloud connected devices by filtering all on-site cloud connected devices stored in the mailbox 155 or other databases, whereas the filtering includes using at least some information from the handshake message used in the discovery loop 419. In an example, there can be used the SPA Public IP address, on-site cloud connected device Public IP address, message creation time or any other suitable information. Accordingly, at operation 444, the mailbox 155 or any other suitable database provides a candidate unbound on-site cloud connected device list to the web API controller 404. At operation 446, the web API controller 404 returns to the SPA 127 the list of candidate unbound on-site cloud connected devices, which are then displayed to the user at operation 448. The displayed information may include, for example, on-site cloud connected device names, storage ring names, or the like.

At operation 450, the user may select a desired unbound data on-site cloud connected device (which is in possession of the user) from the displayed list of candidate unbound on-site cloud connected devices and this selection is transmitted back to the web API controller 404. At operations 452, the web API controller 404 and the mailbox 155 can generate one or more challenge codes to ensure that the unbound data on-site cloud connected devices is indeed is used by or in possession of the user. At operation 454, the one or more challenge codes may be stored in the mailbox 155 or any other suitable database, and at operation 456, the one or more challenge codes can be sent to a task worker 406, which may refer to a dedicated process running on the controller. Furthermore, the task worker 406 may queue the one or more challenge codes for the unbound on-site cloud connected device and, at operation 458, transmit the codes to the unbound on-site cloud connected devices via the service bus 408 and/or the web server 130.

As shown in FIG. 4B, at operation 460, the agent 412 may retrieve a new message from the unbound data on-site cloud connected device and transmit the message to the backbone 150. At operation 462, a corresponding communication is generated for the service bus 408 informing that the new message is received from the unbound data on-site cloud connected device. At operation 464, the service bus 408 may confirm safe receipt of the communication. Furthermore, at operation 466, the backbone 150 may inform the agent 412 that the new message with the human entered code is successfully received.

As further shown in FIG. 4C, at operation 468, the agent 412 associates a challenge key with the values of the one or more challenge codes and sends the challenge key to the configuration database 414. The configuration database 414, at operation 470, publishes the challenge key via a LCD module 418, which may be a dedicated process running on the controller. At operation 472, the LCD module 418 displays for the user the one or more challenge codes.

Furthermore, at operation 474, the user can manually input the one or more challenge codes using the SPA 127. The SPA 127 validates the input code at operation 476 via the web API controller 404, which in turn retrieves the corresponding codes from the mailbox 155 at operation 478.

Still referring to FIG. 4C, at operations 480 and 482, the web API controller 404 can bind the unbound on-site cloud connected device to the service (i.e., binds it to the on-site cloud connected devices 110) with the help of the supervisor 165. At operation 484, the web API controller 404 sends a connect message to the unbound on-site cloud connected devices via the service bus 408 to inform about the binding.

At operation 486, the agent 412 may generate a yet another message regarding the current operation status of the on-site cloud connected device, and, at operation 488, the agent 412 may transmit this message to the backbone 150. The backbone 150 can forwards the new message to the service bus 408. At operation 490, the service bus 408 may respond to the backbone 150 confirming the safe receipt of this message. At operation 491, the backbone 150 may reply to the agent 412 to inform that the new message is received. The agent 412 then may set a connected key (flag) to the true state at the file server 416 at operation 492.

At operations 493, 494, the user may be informed about successful binding the on-site cloud connected device to the service. Otherwise, at operations 495, 496, the user may be informed that binding the on-site cloud connected device to the service was not successful.

Figure 5:
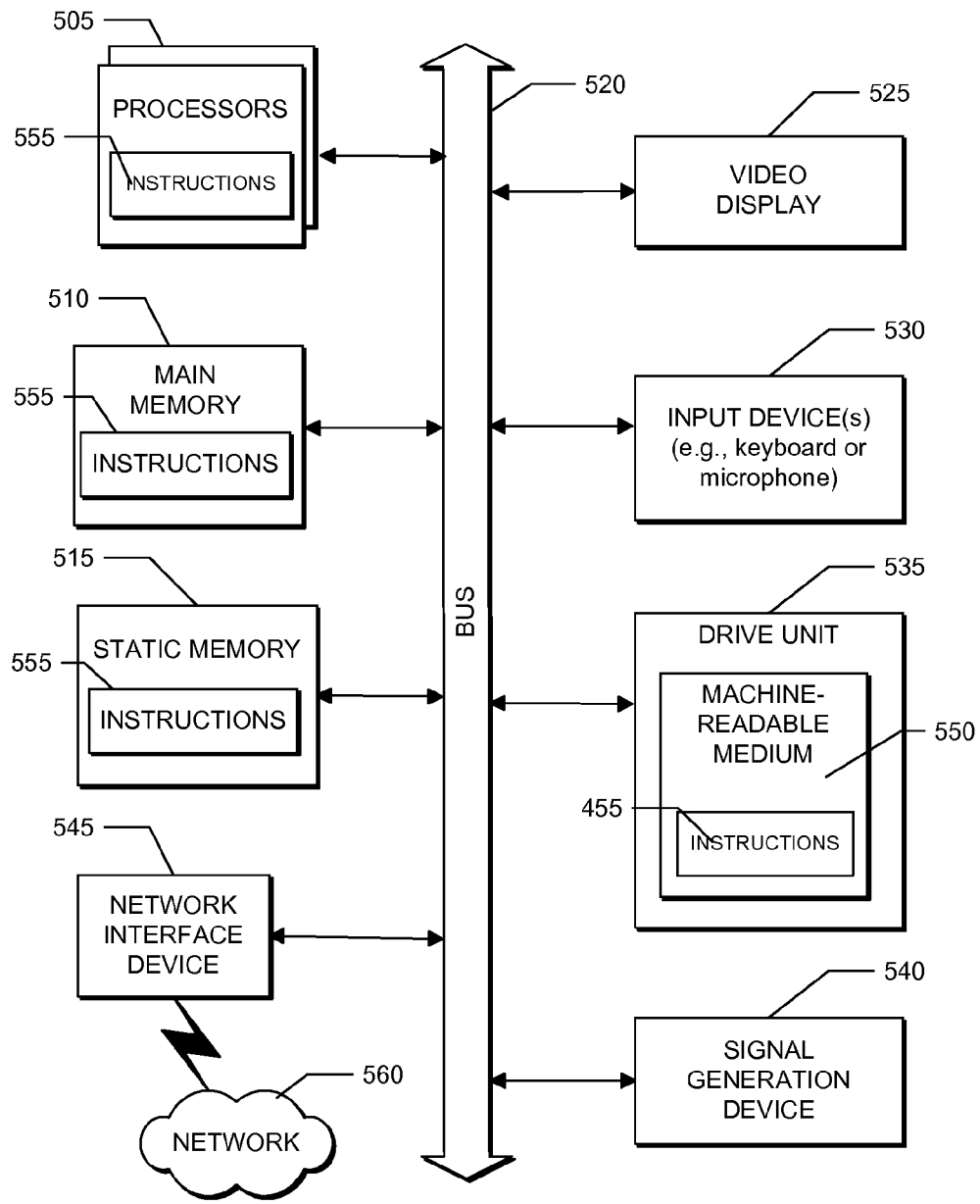
FIG. 5 shows a diagrammatic representation of a computing device for a machine in the example electronic form of a computer system, within which a set of instructions for causing the machine to perform any one or more of the methodologies discussed herein can be executed.

FIG. 5 shows a diagrammatic representation of a computing device for a machine in the example electronic form of a computer system 500, within which a set of instructions for causing the machine to perform any one or more of the methodologies discussed herein can be executed. In various example embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a personal digital assistant, a cellular telephone, a portable music player (e.g., a portable hard drive audio device, such as an Moving Picture Experts Group Audio Layer 3 (MP3) player), gaming pad, portable gaming console, in-vehicle computer, smart-home computer, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor or multiple processors 505 (e.g., a central processing unit (CPU), a graphics processing unit (GPU), or both), and a main memory 510 and a static memory 515, which communicate with each other via a bus 520. The computer system 500 can further include a video display unit 525 (e.g., a liquid crystal display (LCD) or a cathode ray tube (CRT)). The computer system 400 also includes at least one input device 530, such as an alphanumeric input device (e.g., a keyboard), a cursor control device (e.g., a mouse), a microphone, a digital camera, a video camera, and so forth. The computer system 500 also includes a disk drive unit 535, a signal generation device 540 (e.g., a speaker), and a network interface device 545.

The disk drive unit 535 includes a computer-readable medium 550, which stores one or more sets of instructions and data structures (e.g., instructions 555) embodying or utilized by any one or more of the methodologies or functions described herein. The instructions 555 can also reside, completely or at least partially, within the main memory 510 and/or within the processors 505 during execution thereof by the computer system 500. The main memory 510 and the processors 505 also constitute machine-readable media.

The instructions 555 can further be transmitted or received over the network 460 via the network interface device 545 utilizing any one of a number of well-known transfer protocols (e.g., Hyper Text Transfer Protocol (HTTP), CAN, Serial, and Modbus).

While the computer-readable medium 550 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks (DVDs), random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

Thus, private cloud connected device cluster architecture has been disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for secure cloud-based management of private cloud connected devices, the system comprising:

one or more on-site cloud connected devices located within an untrusted customer site;
a multi-tenant cloud-based management service configured to manage the one or more on-site cloud connected devices; and
a user interface to facilitate access to the one or more on-site cloud connected devices located within the untrusted customer site by a user associated with the untrusted customer site;
wherein the user interface and the one or more on-site cloud connected devices are located within an untrusted domain, the multi-tenant cloud-based management service is located within a trusted domain, and the trusted domain and the untrusted domain are separated by a firewall; and
wherein the multi-tenant cloud-based management service is further configured to:
perform a discovery loop operation for identifying and registering the one or more on-site cloud connected devices, wherein the discovery loop operation includes receiving a handshake message from the one or more on-site cloud connected devices, generating a post handshake message including data associated with the one or more on-site cloud connected devices, and storing the post handshake message in a database of the multi-tenant cloud-based management service;
receive a service identifying data from the user interface;
in response to the service identifying data, provide a web application to the user interface, so that the user interface is associated with a public address;
compare the public address of the user interface to an address of the cloud connected device to correlate the service identifying data to the one or more on-site cloud connected devices;
search for one or more candidate unbound on-site cloud connected devices by filtering all the one or more on-site cloud connected devices, in which the filtering includes using at least some of the data from the handshake message used in the discovery loop;
cause displaying, on the user interface, the one or more candidate unbound on-site cloud connected devices;
receive, from the user interface, a user selection of an unbound on-site cloud connected device from the one or more candidate unbound on-site cloud connected devices;
generate and send a machine-generated message to the unbound on-site cloud connected device, so that the unbound on-site cloud connected device causes the machine-generated message to be displayed on the user interface;
receive a user input from the user interface;
authenticate the user by comparing the user input to the machine-generated message; and
based on the authentication, operatively bind the unbound on-site cloud connected device to the multi-tenant cloud-based management service.

2. The system of claim 1, wherein the multi-tenant cloud-based management service includes:
a website domain configured to manage the user interface; and
a backend domain configured to manage the one or more on-site cloud connected devices.

3. The system of claim 2, wherein the website domain includes a controller configured to coordinate requests associated with the user interface.

4. The system of claim 2, wherein the user interface and one or more on-site cloud connected devices use security protocols to communicate to the trusted domain.

5. The system of claim 2, wherein the backend domain includes:
a backbone configured to manage data transmission associated with the one or more on-site cloud connected devices utilizing a first data transmission protocol;
a rendezvous module configured to manage data transmission between the website domain and the backbone utilizing a second data transmission protocol;
a supervisor configured to associate one or more on-site cloud connected devices of the user with the on-site cloud connected devices based on predetermined rules; and
a proxy configured to be associated with the one or more on-site cloud connected devices.

6. The system of claim 5, wherein the rendezvous module includes a mailbox configured to store identification of the one or more on-site cloud connected devices.

7. The system of claim 5, wherein the backbone includes a mailbox configured to store identification of the one or more on-site cloud connected devices.

8. The system of claim 5, wherein the first data transmission protocol includes Hypertext Transfer Protocol Secure (HTTPS), and the second data transmission protocol includes JavaScript Object Notation Remote Procedure Call (JSON-RPC).

9. The system of claim 5, wherein the proxy runs on a separate machine to provide scalability.

10. The system of claim 1, wherein the user interface includes a single-page application running within a web browser.

11. The system of claim 1, wherein the one or more on-site cloud connected devices and the user interface are located on a Local-Area Network (LAN).

12. A method for secure cloud-based management of private cloud connected devices, the method comprising:
providing a multi-tenant cloud-based management service configured to manage one or more on-site cloud connected devices located within an untrusted customer site; and
providing a user interface to facilitate access to the one or more on-site cloud connected devices located within the untrusted customer site by a user associated with the untrusted customer site;
wherein the user interface and the one or more on-site cloud connected devices are located within an untrusted domain, the multi-tenant cloud-based management service is located within a trusted domain, and the trusted domain and the untrusted domain are separated by a firewall; and
wherein the multi-tenant cloud-based management service is further configured to:
perform a discovery loop operation for identifying and registering the one or more on-site cloud connected devices, wherein the discovery loop operation includes receiving a handshake message from the one or more on-site cloud connected devices; generating a post handshake message including data associated with the one or more on-site cloud connected devices, and storing the post handshake message in a database of the multi-tenant cloud-based management service;
receive a service identifying data from the user interface;

in response to the service identifying data, provide a web application to the user interface, so that the user interface is associated with a public address;

compare the public address of the user interface to an address of the cloud connected device to correlate the service identifying data to the one or more on-site cloud connected devices;

search for one or more candidate unbound on-site cloud connected devices by filtering all the one or more on-site cloud connected devices, in which the filtering includes using at least some of the data from the handshake message used in the discovery loop;

cause displaying, on the user interface, the one or more candidate unbound on-site cloud connected devices;

receive, from the user interface, a user selection of an unbound on-site cloud connected device from the one or more candidate unbound on-site cloud connected devices;

generate and send a machine-generated message to the unbound on-site cloud connected device, so that the unbound on-site cloud connected device causes the machine-generated message to be displayed on the user interface;

receive a user input from the user interface;

authenticate the user by comparing the user input to the machine-generated message; and based on the authentication, operatively bind the unbound on-site cloud connected device to the multi-tenant cloud-based management service.

13. The method of claim 12, wherein the providing of the multi-tenant cloud-based management service includes:

providing a website domain configured to manage the user interface; and providing a backend domain configured to manage the one or more on-site cloud connected devices.

14. The method of claim 13, wherein the providing of the backend domain includes:

providing a backbone configured to manage data transmission associated with the one or more on-site cloud connected devices utilizing a first data transmission protocol, wherein the first data transmission protocol includes Hypertext Transfer Protocol Secure (HTTPS);

providing a rendezvous module configured to manage data transmission between the website domain and the backbone utilizing a second data transmission protocol, the second data transmission protocol includes JavaScript Object Notation Remote Procedure Call (JSON-RPC);

providing a supervisor configured to associate one or more on-site cloud connected devices of the user with the one or more on-site cloud connected devices based on predetermined rules; and providing a proxy configured to be associated with the one or more on-site cloud connected devices.

15. The method of claim 14, wherein the providing of the rendezvous module includes providing a mailbox configured to store identification of the one or more on-site cloud connected devices, and wherein the providing of the backbone includes providing a mailbox configured to store identification of the one or more on-site cloud connected devices.

16. The method of claim 14, wherein the proxy runs on a separate machine to provide scalability.

17. The method of claim 14, wherein the user interface and the one or more on-site cloud connected devices are located on a Local-Area Network (LAN).

18. The method of claim 14, wherein the user interface and the one or more on-site cloud connected devices use security protocols to communicate to the trusted domain.

19. A non-transitory processor-readable medium having instructions stored thereon, which when executed by one or more processors, cause the one or more processors to perform the following operations:

provide a multi-tenant cloud-based management service configured to manage a user interface; and provide a backend domain configured to manage one or more on-site cloud connected devices, wherein the multi-tenant cloud-based management service is further configured to:

perform a discovery loop operation for identifying and registering the one or more on-site cloud connected devices, wherein the discovery loop operation includes receiving a handshake message from the one or more on-site cloud connected devices; generating a post handshake message including data associated with the one or more on-site cloud connected devices, and storing the post handshake message in a database of the multi-tenant cloud-based management service;

receive a service identifying data from the user interface;

in response to the service identifying data, provide a web application to the user interface, wherein the user interface is associated with a public address;

compare the public address of the user interface to an address of the cloud connected device to correlate the service identifying data to the one or more on-site cloud connected devices;

search for one or more candidate unbound on-site cloud connected devices by filtering all the one or more on-site cloud connected devices, in which the filtering includes using at least some of the data from the handshake message used in the discovery loop;

cause displaying, on the user interface, the one or more candidate unbound on-site cloud connected devices;

receive, from the user interface, a user selection of an unbound on-site cloud connected device from the one or more candidate unbound on-site cloud connected devices;

generate and send a machine-generated message to the unbound on-site cloud connected device, wherein the unbound on-site cloud connected device causes the machine-generated message to be displayed on the user interface;

receive a user input from the user interface;

authenticate the user by comparing the user input to the machine-generated message; and based on the authentication, operatively bind the unbound on-site cloud connected device to the multi-tenant cloud-based management service;

wherein the providing of the multi-tenant cloud-based management service includes:

provide a website domain configured to manage the user interface, wherein the providing of the backend domain includes:

provide a backbone configured to manage data transmission associated with the one or more on-site cloud connected devices utilizing a first data transmission protocol, wherein the first data transmission protocol includes Hypertext Transfer Protocol Secure (HTTPS);

provide a rendezvous module configured to manage data transmission between the website domain and the backbone utilizing a second data transmission protocol, the second data transmission protocol includes JavaScript Object Notation Remote Procedure Call (JSON-RPC);

provide a supervisor configured to associate one or more unbound on-site cloud connected devices of the user with the one or more on-site cloud connected devices based on predetermined rules;

provide a proxy configured to be associated with the one or more on-site cloud connected devices; and provide a mailbox for storing identification of the one or more on-site cloud connected devices and identification of the one or more unbound on-site cloud connected devices, wherein the mailbox is configured to provide the one or more candidate unbound on-site cloud connected devices to the multi-tenant cloud-based management service.

* * * * *